(12) United States Patent
Xu (10) Patent No.: US 12,363,748 B2
(45) Date of Patent: Jul. 15, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 680 days.

(21) Appl. No.: 17/719,127

(22) Filed: Apr. 12, 2022

(65) Prior Publication Data

US 2022/0240262 A1 Jul. 28, 2022

Related U.S. Application Data

(63) Continuation of application No. PCT/CN2019/111109, filed on Oct. 14, 2019.

(51) Int. Cl.
*H04W 72/542* (2023.01)
*H04L 27/26* (2006.01)
(Continued)

(52) U.S. Cl.
CPC ..... *H04W 72/542* (2023.01); *H04L 27/26025* (2021.01); *H04W 72/0446* (2013.01); *H04W 72/23* (2023.01); *H04W 84/06* (2013.01)

(58) Field of Classification Search
None
See application file for complete search history.

(56) References Cited

U.S. PATENT DOCUMENTS 7,308,005 B1 * 12/2007 Roggendorf .......... H04W 28/06
370/347
2006/0126552 A1 6/2006 Lee et al.
(Continued)

FOREIGN PATENT DOCUMENTS

| CN | 102064876 | 5/2011 |
| CN | 106488546 | 3/2017 |
| CN | 207460179 | 6/2018 |

OTHER PUBLICATIONS

"3rd Generation Partnership Project; Technical Specification Group Radio Access Network; Study on New Radio (NR) to support non-terrestrial networks (Release 15)," 3GPP TR 38.811, Jun. 2019, v15.1.0.
(Continued)

*Primary Examiner* — Robert M Morlan
(74) *Attorney, Agent, or Firm* — Hodgson Russ LLP (57) ABSTRACT

Provided are a wireless communication method and device. The method is applied to a NTN system. The method includes: receiving, by a terminal device, a first signal sent by a network device in a slot n; receiving, by the terminal device, a basic value T for a bidirectional delay and a dynamic adjustment value K for the bidirectional delay which are sent by the network device, the dynamic adjustment value K for the bidirectional delay being determined based on the basic value T for the bidirectional delay and a real-time distance between the terminal device and the network device; and determining a slot for sending a second signal to the network device according to the slot n, the basic value T for the bidirectional delay and the dynamic adjustment value K for the bidirectional delay, wherein the second signal is a response signal for the first signal.

20 Claims, 4 Drawing Sheets

(51) Int. Cl.
  *H04W 72/0446* (2023.01)
  *H04W 72/23* (2023.01)
  *H04W 84/06* (2009.01)

(56) References Cited

U.S. PATENT DOCUMENTS

2018/0220466 A1* 8/2018 Park ................... H04W 74/002
2018/0367359 A1* 12/2018 Akita .................. H04L 5/0007

OTHER PUBLICATIONS

"3rd Generation Partnership Project; Technical Specification Group Radio Access Network; Solutions for NR to support non-terrestrial networks (NTN) (Release 16)," 3GPP TR 38.821, Sep. 2019, v0.8.0.
Oppo, "NTN control procedure for physical layer," 3GPP TSG RAN WG1 #98bis, R1-1910386, Oct. 2019.
EPO, Extended European Search Report for EP Application No. 19949356.0, Oct. 10, 2022.
WIPO, International Search Report and Written Opinion for PCT/CN2019/111109, Jul. 14, 2020.
EPO, Communication for EP Application No. 19949356.0, Mar. 3, 2025.

* cited by examiner

WIRELESS COMMUNICATION METHOD AND DEVICE

CROSS-REFERENCE TO RELATED APPLICATION

This application is a continuation of International Application No. PCT/CN2019/111109, filed Oct. 14, 2019, the entire disclosure of which is incorporated herein by reference.

TECHNICAL FIELD

Embodiments of the present disclosure generally relate to communication technologies, and more particularly, to a wireless communication method and device.

BACKGROUND

In Non-Terrestrial Network (NTN) communications, a network device may be in the form of a satellite. Compared with the terrestrial communication system, a variation range of the distance between the satellite and User Equipment (UE) is relatively large. Therefore, for uplink signals from the UE, it is generally needed to set a large uplink Timing Advance (TA). In addition, a satellite in lower orbit moves faster, and the distance between the satellite and the UE changes faster. For this reason, the feedback delay range required by the satellite system is much larger than the delay range supported by traditional terrestrial systems, and within this specific delay range, the timing relationship between the satellite and the UE changes back and forth, which cannot be well supported by existing systems. Therefore, how to determine by the terminal device the timing relationship between the terminal device and the satellite is a technical problem that needs to be solved urgently.

SUMMARY

Embodiments of the present disclosure provide wireless communication methods and devices, which can provide a method for determining a timing relationship for a terminal device in the NTN system.

According to a first aspect, there is provided a wireless communication method. The method is applied to a non-terrestrial network (NTN) system, and the method includes:
receiving, by a terminal device, a first signal, wherein the first signal is sent by a network device in a slot n;
receiving, by the terminal device, a basic value T for a bidirectional delay and a dynamic adjustment value K for the bidirectional delay which are sent by the network device, wherein the dynamic adjustment value K for the bidirectional delay is determined based on the basic value T for the bidirectional delay and a real-time distance between the terminal device and the network device; and
determining, by the terminal device, a slot for sending a second signal to the network device according to the slot n, the basic value T for the bidirectional delay and the dynamic adjustment value K for the bidirectional delay, wherein the second signal is a response signal for the first signal.

According to a second aspect, there is provided a wireless communication method. The method is applied to a non-terrestrial network (NTN) system, and the method includes:
sending, by a network device, a first signal to a terminal device in a slot n;
sending, by the network device, a basic value T for a bidirectional delay and a dynamic adjustment value K for the bidirectional delay to the terminal device, wherein the dynamic adjustment value K for the bidirectional delay is determined based on the basic value T for the bidirectional delay and a real-time distance between the terminal device and the network device; and
determining, by the network device, a slot for the terminal device to send a second signal to the network device according to the slot n, the basic value T for the bidirectional delay and the dynamic adjustment value K for the bidirectional delay, wherein the second signal is a response signal for the first signal.

According to a third aspect, there is provided a terminal device configured to perform the method according to the first aspect or implementations of the first aspect.

Specifically, the terminal device includes functional modules configured to perform the method according to the first aspect or implementations of the first aspect.

According to a fourth aspect, there is provided a network device configured to perform the method according to the second aspect or implementations of the second aspect.

Specifically, the network device includes functional modules configured to perform the method according to the second aspect or implementations of the second aspect.

According to a fifth aspect, there is provided a terminal device, including a processor and a memory configured to store a computer program. The processor is configured to call and run the computer program stored in the memory to perform the method according to the first aspect or implementations of the first aspect.

According to a sixth aspect, there is provided a network device, including a processor and a memory configured to store a computer program. The processor is configured to call and run the computer program stored in the memory to perform the method according to the second aspect or implementations of the second aspect.

According to a seventh aspect, there is provided a device configured to perform the method according to any one of the first to second aspects or implementations of any one of the first to second aspects.

Specifically, the device includes a processor. The processor is configured to call and run a computer program from a memory to cause an apparatus in which the device is installed to perform the method according to any one of the first to second aspects or implementations of any one of the first to second aspects.

According to an eighth aspect, there is provided a computer-readable storage medium having a computer program stored thereon, wherein the computer program is configured to cause a computer to perform the method according to any one of the first to second aspects or implementations of any one of the first to second aspects.

According to a ninth aspect, there is provided a computer program product including computer instructions which are configured to cause a computer to perform the method according to any one of the first to second aspects or implementations of any one of the first to second aspects.

According to a tenth aspect, there is provided a computer program. When the computer runs on a computer, the computer is caused to perform the method according to any one of the first to second aspects or implementations of any one of the first to second aspects.

In technical solutions provided by the present disclosure, for the NTN system, the relative position between the terminal device and the network device may be constantly changing. In this case, the network device can send the dynamic adjustment value K for the bidirectional delay to the terminal device according to the real-time distance between the terminal device and the network device. The terminal device can determine the slot for sending the second signal to the network device according to the dynamic adjustment value, the basic value T for the bidirectional delay, and the slot in which the network device sends the first signal, so as to determine the timing relationship between the first signal and the second signal.

DETAILED DESCRIPTION

Figure 1:
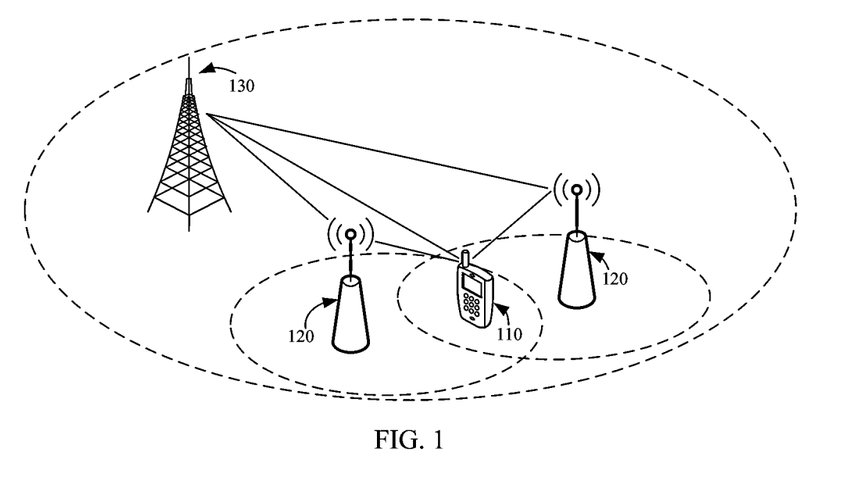
FIG. 1 is a schematic diagram of a wireless communication system to which embodiments of the present disclosure are applied.

FIG. 1 is a schematic diagram of a system 100 according to an embodiment of the present disclosure.

As shown in FIG. 1, a terminal device 110 is connected to a first network device 130 in a first communication system and a second network device 120 in a second communication system. For example, the first network device 130 is a Long Term Evolution (LTE) network device, and the second network device 120 is a New Radio (NR) network device.

The first network device 130 and the second network device 120 may include multiple cells.

It should be understood that FIG. 1 is an example of a communication system according to an embodiment of the present disclosure, and embodiments of the present disclosure are not limited to the structure shown in FIG. 1.

As an example, the communication system to which embodiments of the present disclosure can be applied may include at least multiple network devices under the first communication system and/or multiple network devices under the second communication system.

For example, the system 100 shown in FIG. 1 may include one primary network device under the first communication system and at least one secondary network device under the second communication system. The at least one secondary network device is connected to the one primary network device to form a multi-connection, and is connected to the terminal device 110 to provide services for the terminal device 110. Specifically, the terminal device 110 may simultaneously establish connections through the primary network device and the at least one secondary network device.

According to some embodiments, the connection established between the terminal device 110 and the primary network device is a primary connection, and the connection established between the terminal device 110 and the secondary network device is a secondary connection. The control signaling for the terminal device 110 may be transmitted through the primary connection, and the data for the terminal device 110 may be transmitted through the primary connection and the secondary connection at the same time, or only through the secondary connection.

As another example, the first communication system and the second communication system in embodiments of the present disclosure are different, but the specific categories of the first communication system and the second communication system are not limited.

For example, the first communication system and the second communication system may be various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Time Division Duplex (TDD), Universal Mobile Telecommunication System (UMTS), etc.

The primary network device and the at least one secondary network device may be any access network device.

Optionally, in some embodiments, the access network device may be a base station (Base Transceiver) Station, BTS) in a Global System of Mobile communication (GSM) system or a Code Division Multiple Access (CDMA), or a base station (NodeB, NB) in a Wideband Code Division Multiple Access (WCDMA) system, or an evolved base station (Evolutional Node B, eNB or eNodeB) in a Long Term Evolution (LTE) system.

Optionally, the access network device may also be a base station (gNB) in a Next Generation Radio Access Network (NG RAN) or in an NR system, or a wireless controller in a Cloud Radio Access Network (CRAN), or the access network device may be a relay station, an access point, an in-vehicle device, a wearable device, or a network device in a future evolved Public Land Mobile Network (PLMN), etc.

The system 100 shown in FIG. 1 will be described by using an example where the first network device 130 is used as the primary network device, and the second network device 120 is used as the secondary network device.

The first network device 130 may be an LTE network device, and the second network device 120 may be an NR network device. Alternatively, the first network device 130 may be an NR network device, and the second network device 120 may be an LTE network device. Alternatively, both the first network device 130 and the second network device 120 may be NR network devices. Alternatively, the first network device 130 may be a GSM network device, or a CDMA network device, or the like, and the second network device 120 may also be a GSM network device, or a CDMA network device, or the like. Alternatively, the first network device 130 may be a macrocell base station, and the second network device 120 may be a microcell base station, a picocell base station, or a femtocell base station.

According to some embodiments, the terminal device 110 may be any terminal device The terminal device may be connected in the following manners (including but not limited to):

The terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

It should be understood that the terms "system" and "network" are often used interchangeably herein.

It should also be understood that the communication system 100 shown in FIG. 1 may also be an NTN system. Specifically, the NTN technology generally provides communication services to terrestrial users by means of satellite communication. That is, the network device in FIG. 1 may be a satellite. Compared with terrestrial cellular network communications, the satellite communication has many unique advantages. First of all, the satellite communication is not limited by users' geographical areas. For example, general terrestrial communication cannot cover areas such as oceans, mountains, and deserts where due to the inability to set up communication equipment or the lack of communication coverage due to sparse population, normal communications cannot be carried out. For the satellite communication, since a satellite can cover a large ground, and the satellite can orbit around the earth, theoretically every corner of the earth can be covered by the satellite communication. Secondly, the satellite communication has great social value. The satellite communications can cover at low cost remote mountainous areas and poor and backward countries or regions, so that people in these regions can enjoy advanced voice communication and mobile Internet technologies, which is conducive to narrowing the digital divide with developed regions and promoting development in these regions. Thirdly, the satellite communication distance is long, but the cost of communication does not increase significantly when the communication distance increases. Finally, the satellite communication has high stability and is not limited by natural disasters.

The satellite in embodiments of the present disclosure can use multiple beams to cover the ground, and one satellite can form dozens or even hundreds of beams to cover the ground; one satellite beam can cover a ground area with a diameter of tens to hundreds of kilometers.

According to different orbital altitudes, communication satellites can be divided into Low-Earth Orbit (LEO) satellites, Medium-Earth Orbit (MEO) satellites, Geostationary Earth Orbit (GEO) satellites, High Elliptical Orbit (HEO) satellites, etc.

Taking a GEO satellite as an example, the distance between the GEO satellite and a UE is relatively large, up to 4800 kilometers, which is equivalent to a one-way propagation delay of 16 ms and a bidirectional propagation delay of 32 ms. Therefore, for the uplink signal for the UE, it is generally needed to set a larger TA. For a low-orbit satellite, the bidirectional delay difference between the satellite and UEs can reach 16 ms. That is to say, the bidirectional delay of the nearest UE covered by the low-orbit satellite may be less than the bidirectional delay of the farthest UE by 16 ms, and the bidirectional delay of the nearest UE is also greater than 4 ms, while the feedback delay of the traditional hybrid automatic repeat request (HARQ) is at least close to 0. Therefore, the timing relationship in the NTN system cannot directly adopt the timing relationship in the traditional terrestrial communication network system.

In addition, in the NTN communication system, a satellite in low orbit moves fast, and the distance between the satellite and the UE changes fast. The timing relationship between the satellite and the UE is related to the distance between the satellite and the UE. The continuously changing distance between the satellite and the UE means that the timing relationship between the satellite and the UE is also changing continuously. However, the adjustment range of the current HARQ adjustment mechanism is very limited, which is not enough to support such a dynamically changing timing relationship.

Figure 2:
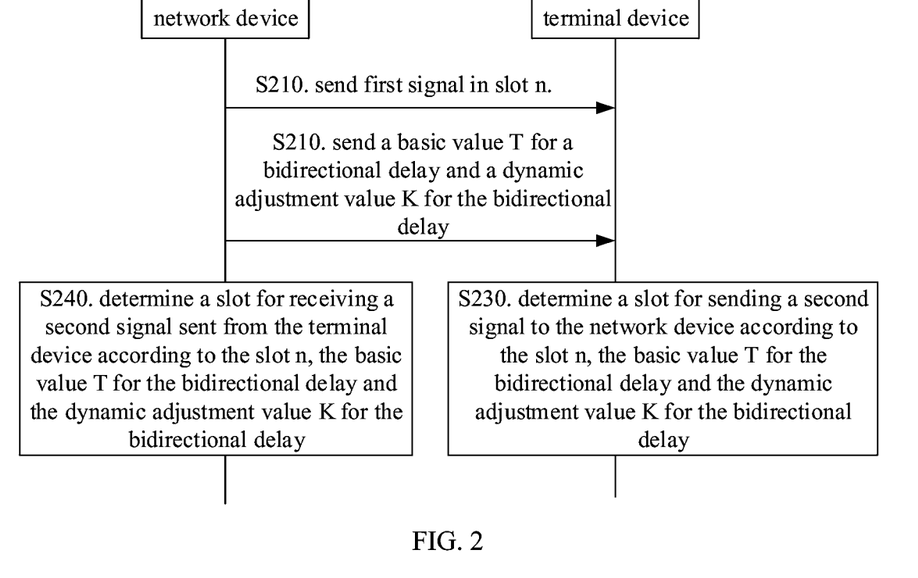
FIG. 2 is a schematic diagram of a wireless communication method according to an embodiment of the present disclosure.

Based on this, embodiments of the present disclosure provide a wireless communication method, which can provide a method for determining a timing relationship for a terminal device in the NTN system. The methods in embodiments of the present disclosure can be applied to the NTN system, or may be applied to a system in which the relative position between a terminal device and a network device is constantly changing. As shown in FIG. 2, the method includes steps S210-S230.

In S210, a network device sends a first signal to a terminal device in a slot n.

It can be understood that, in a case where the network device and the terminal device have been synchronized and aligned, the network device sending the first signal in slot n can also be understood as the terminal device receiving the first signal in a downlink slot n.

According to some embodiments, the network device in embodiments of the present disclosure may be a network device in the NTN system, such as a satellite; the terminal device may be a terminal device in the NTN system.

In S220, the network device sends a basic value T for a bidirectional delay and a dynamic adjustment value K for the bidirectional delay to the terminal device.

The bidirectional delay may be understood as the sum of a time period from the network device sending a signal until the terminal device receives the signal, and a time period from the terminal device sending a signal until the network device receives the signal.

The basic value T for the bidirectional delay may be a fixed value, which is used as the basis for the network device to adjust the bidirectional delay. The dynamic adjustment value K for the bidirectional delay may be variable, and the bidirectional delay may be adjusted based on the basic value T by using the adjustment value K, so that the adjusted bidirectional delay matches the real-time distance between the terminal device and the network device. The dynamic adjustment value K for the bidirectional delay in embodiments of the present disclosure may be determined, for example, according to the basic value T and the real-time distance between the terminal device and the network device.

The real-time distance between the terminal device and the network device may also be referred to as the current distance between the terminal device and the network device.

In S230, the terminal device determines a slot for sending a second signal to the network device according to the slot n, the basic value T for the bidirectional delay, and the dynamic adjustment value K for the bidirectional delay.

The second signal is a response signal for the first signal. That is to say, the terminal device can determine a timing relationship between the first signal and the second signal according to the slot n, the basic value T for the bidirectional delay, and the dynamic adjustment value K for the bidirectional delay. In other words, the terminal device can determine in which slot the terminal device should send the second signal to the network device.

In S240, the network device determines a slot for receiving the second signal sent from the terminal device according to the slot n, the basic value T for the bidirectional delay, and the dynamic adjustment value K for the bidirectional delay.

The second signal is a response signal for the first signal. That is to say, the network device can determine a timing relationship between the first signal and the second signal according to the slot n, the basic value T for the bidirectional delay, and the dynamic adjustment value K for the bidirectional delay. In other words, the network device can determine in which slot the network device should receive the second signal sent from the terminal device.

It can be understood that, in a case where the terminal device and the network device are time synchronized, the terminal device sending the second signal to the network device in a slot a may indicate that the network device receives the second signal in a uplink slot n.

For the convenience of description, the following uses a terminal device as an example to describe determining the slot for sending the second signal.

Taking the NTN system as an example, the distance between the network device and the terminal device is constantly changing, and the network device may continuously adjust the bidirectional delay between the terminal device and the network device by sending the dynamic adjustment value K to the terminal device. The terminal device may determine the timing relationship between the first signal and the second signal according to the basic value T for the bidirectional delay and the dynamic adjustment value K. Accordingly, upon receipt of the first signal, the terminal device knows in which slot to send the second signal to the network device.

It can be understood that, at different moments, due to different distances or relative positions between the network device and the terminal device, the dynamic adjustment value K sent by the network device to the terminal device may be different.

In embodiments of the present disclosure, the basic value T for the bidirectional delay may take absolute time as a time unit, for example, the basic value T takes ns as the time unit; or, the basic value T for the bidirectional delay may take a slot, a radio frame, or a subframe, or the like as a time unit.

Similarly, the dynamic adjustment value K in embodiments of the present disclosure may take absolute time as a time unit. For example, the dynamic adjustment value K takes ns (nanosecond) as the time unit; or the dynamic adjustment value K may take a slot, a radio frame, a subframe, or the like as a time unit.

If the time units of the basic value T and dynamic adjustment value K are not slot, the terminal device may convert the basic value T and dynamic adjustment value K as being in the time unit of slot according to a relationship between slot and other time units.

If the time units of the basic value T and dynamic adjustment value K are slot, the terminal device may send the second signal in a slot $(n*2^{m2-m1}+T+K)$;

where:

m1 is a subcarrier spacing coefficient of the first signal, and m2 is the subcarrier spacing coefficient of the second signal;

K may be a positive number or a negative number, which may be determined according to the real-time distance between the terminal device and the network device. If a reference distance used to determine the basic value T is less than the current distance between the terminal device and the network device, then K is a positive value; if the reference distance used to determine the basic value T is greater than the current distance between the terminal device and the network device, then K is a negative value.

For the NR system, the subcarrier spacing coefficient may be used to represent the subcarrier spacing. For example, the subcarrier spacing may be expressed as $2^u*15$ kHz, where u represents the subcarrier spacing coefficient, u=1, 2, ..., 5.

When u=5, the subcarrier spacing is the largest, which is 480 kHz. The duration of symbols and frames is inversely proportional to the subcarrier spacing, that is, the larger the subcarrier spacing, the shorter the symbol duration. The length of a slot (slot length unit) is directly related to the length of a symbol. Therefore, the larger the subcarrier spacing, the shorter the slot.

Of course, if the subcarrier spacing coefficients of the first signal and the second signal are the same, that is, m1=m2, the terminal device may send the second signal in (n+T+K). That is to say, in some embodiments of the present disclosure, the subcarrier spacing used for sending the first signal and the subcarrier spacing used for sending the second signal may be the same or different.

If the basic value T takes absolute time as the time unit and the dynamic adjustment value K takes a slot as the time unit, the terminal device may send the second signal in a slot $(n*2^{m2-m1}+\lceil T/Ts \rceil+K)$;

where Ts is the duration of a slot corresponding to the bandwidth part (BWP) where the second signal is located, and $\lceil\ \rceil$ means rounding up.

Of course, if the subcarrier spacing coefficients of the first signal and the second signal are the same, that is, m1=m2, the terminal device may send the second signal in a slot $(n+\lceil T/Ts \rceil+K)$.

If both the base value T and the dynamic adjustment value K take the absolute time as the time unit, the terminal device may send the second signal in a slot $(n*2^{m2-m1}+\lceil (T+K)/Ts \rceil)$.

Of course, if the subcarrier spacing coefficients of the first signal and the second signal are the same, that is, m1=m2, the terminal device may send the second signal in a slot $(n+\lceil (T+K)/Ts \rceil)$.

If the basic value T takes a slot as the time unit and the dynamic adjustment value K takes the absolute time as the time unit, then the terminal device may send the second signal in a slot (n n*$2^{m2-m1}$+T+⌈K/Ts⌉).

Of course, if the subcarrier spacing coefficients of the first signal and the second signal are the same, that is, m1=m2, the terminal device may send the second signal in a slot (n+T+⌈K/Ts⌉).

If the basic value T takes the absolute time as the time unit, the basic value T may take, for example, Tc as the time unit, that is, the basic value T may be a multiple of Tc. Tc is the minimum time unit used by a physical layer interface.

For example, Tc may be defined as:

$$\frac{1}{480 \cdot 10^3 \cdot 4096} = 0.509 \text{ ns},$$

that is, Tc=0.509 ns. The basic value T takes 0.509 ns as the time granularity, that is, the basic value T may take 480·4096·Tc/$2^u$ as the unit. The definition of parameter $2^u$ is associated with the subcarrier spacing (SCS), SCS=$2^u$·15 kHz.

Of course, the value of Tc may also be other values, for example, the value of Tc may be a multiple of 0.509 ns, such as Tc=2*0.509 ns, and embodiments of the present disclosure does not specifically limit the value of Tc.

It can be understood that the time unit of Ts is consistent with that of the basic value T. When the basic value T takes Tc as the time unit, Ts also takes Tc as the time unit.

The following description is made by taking an example where the basic value T takes the absolute time as the time unit, and the dynamic adjustment value K takes a slot as the time unit.

If T=T1+ΔT1, the slot for sending the second signal is a slot (n*$2^{m2-m1}$+⌈(T1+ΔT1)/Ts⌉+K1). In this case, the basic value T1 is set according to the minimum bidirectional delay, and K1 is a dynamic offset set according to the minimum bidirectional delay.

T1 is determined according to a minimum distance X1 that the network device allows all terminal devices to access, ΔT1 is determined based on a difference between the minimum distance X1 that the network device allows all terminal devices to access and a minimum distance X2 that the network device allows the terminal device to access, and K1 is determined according to the minimum distance X2 that the network device allows the terminal device to access and a real-time distance X3 between the terminal device and the network device.

In this way, by setting the minimum bidirectional delay, and then setting the offset on the basis of the minimum bidirectional delay, when the network device senses that the terminal device is moving far away, the delay may be increased by adding K1.

Generally speaking, X1≤X2.

The minimum distance that the network device allows all terminal devices to access may be the default in the system. That is, only terminal devices whose distances from the network device are greater than or equal to X1 can be allowed to access by default in the system. Alternatively, the minimum distance that the network device allows all terminal devices to access may be determined according to an orbit altitude of the network device, or according to the distance between the nearest terminal device among all the terminal devices and the network device.

The nearest terminal device can be understood as the terminal device that is closest to the network device among all the terminal devices.

It can be understood that the value of T1 may be directly a default value in the system, instead of determining the value of T1 according to the distance X1.

The minimum distance that the network device allows all terminal devices to access is determined according to the orbit altitude of the network device, which means that the minimum distance X1 that the network device allows all terminal devices to access is equal to the orbit altitude of the network device, or means that the minimum distance X1 that the network device allows all terminal devices to access is equal to the orbit altitude of the network device plus a first value, and the first value may be greater than 0 or smaller than 0.

It is assumed that the minimum distance X1 that the network device allows all terminal devices to access is equal to the orbit altitude of the network device, but due to the limitation of the running trajectory of the network device, the minimum distance between the network device and the terminal device during movement may be greater than the orbit altitude of the network device. Thus, in embodiments of the present disclosure, the ΔT1 of the terminal device may be determined according to the difference between the minimum distance between the network device and the terminal device and the orbit altitude of the network device. For example, based on the difference between X1 and X2, the period of time required for the signal to propagate the distance |X2−X1| is determined, thereby determining ΔT1.

The minimum distance that the network device allows a first terminal device to access may refer to the minimum distance between the network device and the first terminal device in the process of relative movement between the network device and the first terminal device.

T1 may be sent by the network device to the terminal device via a system broadcast message. For example, the T1 may be sent by the network device to the terminal device via a system broadcast message before the terminal device performs initial access, and the T1 may be used for the initial access of the terminal device.

In the current NTN system, the T1 sent by the network device to the terminal device takes the absolute time as the time unit, and thus it is a preferred implementation that both T1 and ΔT1 take the absolute time as the time unit.

ΔT1 may be sent by the network device to the terminal device via a system broadcast message, or ΔT1 may be sent to the terminal device via a user-specific signaling.

If ΔT1 is sent to the terminal device via a system broadcast message, the distance X2 may refer to the distance between the network device and the nearest terminal device; if ΔT1 is sent to the terminal device via user-specific signaling, it is assumed that the network device sends ΔT1 to the first terminal device via user-specific signaling, then the distance X2 may refer to the minimum distance between the network device and the first terminal device.

If T=T2−ΔT2, the slot for sending the second signal is a slot (n*$2^{m2-m1}$+⌈(T2−ΔT2)/Ts⌉−K2). In this case, the basic value T2 is set according to the maximum bidirectional delay, and K2 is a dynamic offset which is set according to the maximum bidirectional delay.

T2 is determined according to a maximum distance Y1 that the network device allows all terminal devices to access, ΔT2 is determined based on a difference between the maximum distance Y1 that the network device allows all the terminal devices to access and a maximum distance Y2 that the network device allows the terminal device to access, and K2 is determined according to the maximum distance Y2 that the network device allows the terminal device to access and a real-time distance Y3 between the terminal device and the network device.

In this way, by setting the maximum bidirectional delay, and then setting the offset based on the maximum bidirectional delay, when the network device senses that the terminal device is approaching, the delay can be shortened by subtracting K2.

Generally speaking, Y1≥Y2.

The maximum distance that the network device allows all terminal devices to access may be a default value in the system, that is, only the terminal devices whose distances from the network device are less than or equal to Y1 can be allowed to access by default in the system; or the maximum distance that the network device allows all terminal devices to access may be determined according to the distance between the farthest terminal device among all the terminal devices and the network device.

The farthest terminal device can be understood as the terminal device with the farthest distance from the network device among all the terminal devices.

Assuming that the maximum distance that the network device allows all terminal devices to access is the distance between the farthest terminal device and the network device, for the first terminal device, during the movement of the network device, the maximum distance Y2 between the first terminal device and the network device may be smaller than the distance Y1 between the farthest terminal device and the network device. Therefore, in embodiments of the present disclosure, ΔT2 may be determined according to the difference between Y1 and Y2. For example, based on the difference between Y1 and Y2, the period of time required for the signal to propagate the distance |Y1−Y2| is determined, thereby determining ΔT2.

T2 may be sent by the network device to the terminal device via a system broadcast message. For example, the T2 may be sent by the network device to the terminal device via a system broadcast message before the terminal device performs initial access, and the T2 may be used for the initial access of the terminal device.

In the current NTN system, the T2 sent by the network device to the terminal device takes the absolute time as the time unit, and thus it is a preferred implementation that both T2 and ΔT2 take absolute time as the time unit.

ΔT2 may be sent by the network device to the terminal device via a system broadcast message, or ΔT2 can be sent to the terminal device via user-specific signaling.

If ΔT2 is sent to the terminal device via a system broadcast message, the distance Y2 can refer to the distance between the network device and the farthest terminal device; if ΔT2 is sent to the terminal device through user-specific signaling, it is assumed that the network device sends ΔT2 to the first terminal device via user-specific signaling, then the distance Y2 may refer to the maximum distance between the network device and the first terminal device.

Assuming that the terminal device does not receive the ΔT1 sent by the network device, the terminal device may determine ΔT1 as 0 by default.

Assuming that the terminal device does not receive the ΔT2 sent by the network device, the terminal device may determine ΔT2 as 0 by default.

Embodiments of the present disclosure do not specifically limit the first signal and the second signal as well as he manner in which the network device sends the dynamic adjustment value K to the terminal device.

Figure 3:
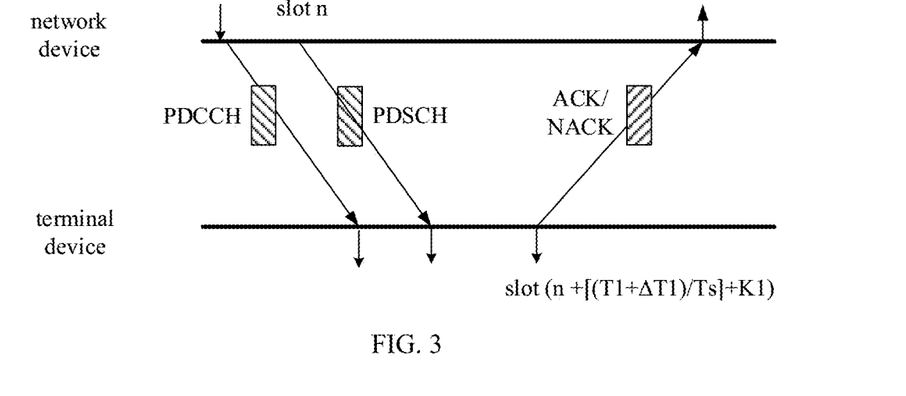
FIG. 3 is a schematic diagram of a timing relationship for downlink HARQ according to an embodiment of the present disclosure.

For example, the first signal may be a Physical Downlink Shared Channel (PDSCH), and the second signal may be a feedback signal for the PDSCH, that is, the second signal may be an acknowledgement (ACK)/non-acknowledgement (NACK) feedback signal. As shown in FIG. 3, the network device sends a Physical Downlink Control Channel (PDCCH) to the terminal device to indicates that the network device sends PDSCH in slot n, and the PDCCH also indicates the dynamic adjustment value K1. The network device sends PDSCH in slot n, and the terminal device receives the PDSCH in the downlink slot n; then the terminal device can determine that the ACK/NACK feedback signal is sent in the slot (n+[(T1+ΔT1)/Ts]+K1) according to the method described above.

In this case, the dynamic adjustment value K1 may be indicated by the PDCCH which schedules the PDSCH, and under such condition, the dynamic adjustment value K may represent a dynamically indicated offset from PDSCH to ACK/NACK feedback.

The method shown in FIG. 3 is only an example, and the network device may also set the offset value according to the maximum bidirectional delay, that is, indicate the dynamic offset value K2 through the PDCCH.

According to the methods described above, the terminal device can determine the downlink HARQ timing.

Figure 4:
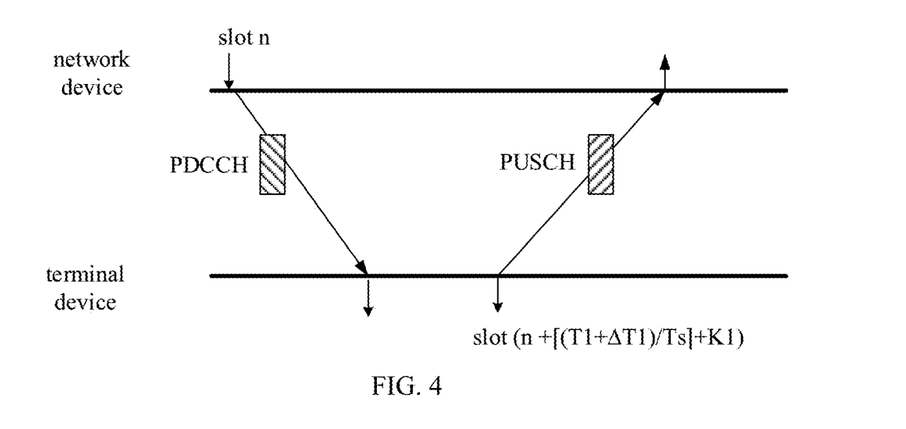
FIG. 4 is a schematic diagram of a timing relationship for an uplink HARQ according to an embodiment of the present disclosure.

For another example, the first signal may be a PDCCH, and the second signal may be a Physical Uplink Shared Channel (PUSCH). The PDCCH here is used for scheduling uplink transmission. As shown in FIG. 4, the network device sends a PDCCH to the terminal device in the slot n, the PDCCH is used for scheduling uplink transmission, and the PDCCH is also used to indicate the dynamic offset value K1. After receiving the PDCCH in the downlink slot n, the terminal device determines the slot for transmitting the PUSCH as the slot (n+[(T1+ΔT1)/Ts]+K1) according to the methods described above.

In this case, the dynamic adjustment value K1 may be indicated by the PDCCH.

The method shown in FIG. 4 is only an example, and the network device may also set the offset value according to the maximum bidirectional delay, that is, the PDCCH may be used to indicate the dynamic offset value K2.

According to the methods described above, the terminal device can determine the uplink HARQ timing.

For another example, the first signal may be a PDCCH, and the second signal may be a channel state information (CSI) feedback signal. The PDCCH here is used to trigger CSI feedback for uplink transmission.

In this case, the dynamic adjustment value K may be indicated by the PDCCH.

For another example, the first signal may be a PDCCH, and the second signal may be a sounding reference signal (SRS).

In this case, the dynamic adjustment value K may be indicated by the PDCCH.

The wireless communication methods according to embodiments of the present disclosure are described in detail above. The devices according to embodiments of the present disclosure will be described below with reference to FIG. 5 to FIG. 9. The technical features described in the method embodiments are applicable to the following device embodiments.

Figure 5:
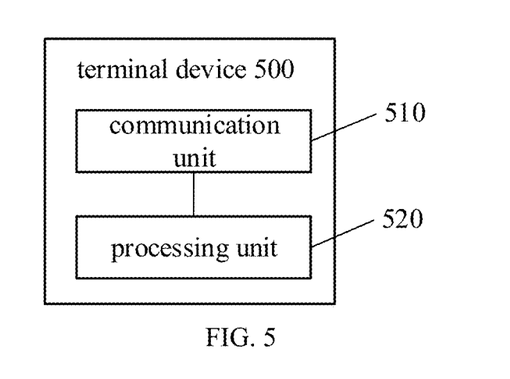
FIG. 5 is a schematic block diagram of a terminal device according to an embodiment of the present disclosure.

FIG. 5 is a schematic block diagram of a terminal device according to an embodiment of the present disclosure. The terminal device may be any one of the terminal devices described above. For example, the terminal device may be a terminal device in the NTN system. The terminal device in FIG. 5 includes a communication unit 510 and a processing unit.

The communication unit 510 is configured to receive a first signal, wherein the first signal is sent by a network device in a slot n.

The communication unit 510 is further configured to receive a basic value T for a bidirectional delay and a dynamic adjustment value K for the bidirectional delay which are sent by the network device, wherein the dynamic adjustment value K for the bidirectional delay is determined based on the basic value T for the bidirectional delay and a real-time distance between the terminal device and the network device.

The processing unit 520 is configured to determine a slot for sending a second signal to the network device according to the slot n, the basic value T for the bidirectional delay and the dynamic adjustment value K for the bidirectional delay, wherein the second signal is a response signal for the first signal.

According to some embodiments, a time unit for the basic value T for the bidirectional delay is absolute time, a time unit for K is a slot, and the slot for sending the second signal is a slot $(n*2^{m2-m1}+\lceil T/Ts\rceil+K)$, where m1 is a subcarrier spacing coefficient of the first signal, m2 is a subcarrier spacing coefficient of the second signal, Ts is a duration of a slot corresponding to a bandwidth part where the second signal is located, $\lceil\ \rceil$ means rounding up, and K is an integer.

According to some embodiments, the time unit for the basic value T for the bidirectional delay is Tc, and Tc is a minimum time unit used by a physical layer interface.

According to some embodiments, Tc=0.509 ns.

According to some embodiments, if T=T1+ΔT1, the slot for sending the second signal is a slot $(n*2^{m2-m1}+\lceil(T1+\Delta T1)/Ts\rceil+K1)$, where T1 is determined according to a minimum distance that the network device allows all terminal devices to access, ΔT1 is determined based on a difference between the minimum distance that the network device allows all terminal devices to access and a minimum distance that the network device allows the terminal device to access, and K1 is determined according to the minimum distance that the network device allows the terminal device to access and a real-time distance between the terminal device and the network device.

According to some embodiments, the minimum distance that the network device allows all terminal devices to access depends on an orbit altitude of the network device, or, the minimum distance that the network device allows all terminal devices to access depends on a distance between a nearest terminal device among all the terminal devices and the network device.

According to some embodiments, the minimum distance that the network device allows the terminal device to access is a minimum distance between the network device and the terminal device during a relative movement between the network device and the terminal device.

According to some embodiments, if T=T2−ΔT2, the slot for sending the second signal is a slot $(n*2^{m2-m1}+\lceil(T2-\Delta T2)/Ts\rceil-K2)$, where T2 is determined according to a maximum distance that the network device allows all terminal devices to access, ΔT2 is determined based on a difference between the maximum distance that the network device allows all the terminal devices to access and a maximum distance that the network device allows the terminal device to access, and K2 is determined according to the maximum distance that the network device allows the terminal device to access and a real-time distance between the terminal device and the network device.

According to some embodiments, the maximum distance that the network device allows all terminal devices to access depends on a distance between the network device and a farthest terminal device among all the terminal devices.

According to some embodiments, the maximum distance that the network device allows the terminal device to access is a maximum distance between the network device and the terminal device during a relative movement between the network device and the terminal device.

According to some embodiments, the T1 and/or the T2 are received by the terminal device via a system broadcast message, and/or, the ΔT1 and/or the ΔT2 are received by the terminal device via a system broadcast message or user-specific signaling.

According to some embodiments, the processing unit 520 is further configured to:

in response to the ΔT1 not being received, determine that the ΔT1 is 0; and/or, in response to the ΔT2 not being received, determine that the ΔT2 is 0.

According to some embodiments, the T1 or the T2 is used for initial access of the terminal device.

According to some embodiments, the first signal is a Physical Downlink Shared Channel (PDSCH), the second signal is an acknowledgement (ACK)/non-acknowledgement (NACK) feedback signal, and the dynamic adjustment value K for the bidirectional delay is indicated by a Physical Downlink Control Channel (PDCCH) which schedules the PDSCH.

According to some embodiments, the first signal is a PDCCH, the second signal is a Physical Uplink Shared Channel (PUSCH), and the dynamic adjustment value K for the bidirectional delay is indicated by the PDCCH.

According to some embodiments, the first signal is a PDCCH, the second signal is a Channel State Information (CSI) feedback signal, and the dynamic adjustment value K for the bidirectional delay is indicated by the PDCCH.

According to some embodiments, the first signal is a PDCCH, the second signal is a Sounding Reference Signal (SRS), and the dynamic adjustment value K for the bidirectional delay is indicated by the PDCCH.

Figure 6:
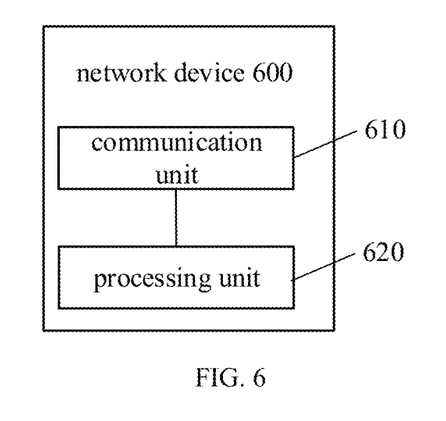
FIG. 6 is a schematic block diagram of a network device according to an embodiment of the present disclosure.

FIG. 6 is a schematic block diagram of a network device according to an embodiment of the present disclosure. The network device may be any one of the network devices described above. For example, the network device is a network device in the NTN system. The network device 600 in FIG. 6 includes a communication unit 610 and a processing unit 620.

The communication unit 610 is configured to send a first signal to a terminal device in a slot n.

The communication unit 610 is further configured to send a basic value T for a bidirectional delay and a dynamic adjustment value K for the bidirectional delay to the terminal device, wherein the dynamic adjustment value K for the bidirectional delay is determined based on the basic value T for the bidirectional delay and a real-time distance between the terminal device and the network device.

The processing unit 620 configured to determine a slot for receiving a second signal sent by the terminal device according to the slot n, the basic value T for the bidirectional delay and the dynamic adjustment value K for the bidirectional delay, wherein the second signal is a response signal for the first signal.

According to some embodiments, a time unit for the basic value T for the bidirectional delay is absolute time, a time unit for K is a slot, and the slot for sending the second signal is a slot $(n*2^{m2-m1}+\lceil T/Ts \rceil+K)$, where m1 is a subcarrier spacing coefficient of the first signal, m2 is a subcarrier spacing coefficient of the second signal, Ts is a duration of a slot corresponding to a bandwidth part where the second signal is located, $\lceil \ \rceil$ means rounding up, and K is an integer.

According to some embodiments, the time unit for the basic value T for the bidirectional delay is Tc, and Tc is a minimum time unit used by a physical layer interface.

According to some embodiments, Tc=0.509 ns.

According to some embodiments, if T=T1+ΔT1, the slot for sending the second signal is a slot $(n*2^{m2-m1}+\lceil (T1+\Delta T1)/Ts \rceil+K1)$, where T1 is determined according to a minimum distance that the network device allows all terminal devices to access, ΔT1 is determined based on a difference between the minimum distance that the network device allows all terminal devices to access and a minimum distance that the network device allows the terminal device to access, and K1 is determined according to the minimum distance that the network device allows the terminal device to access and a real-time distance between the terminal device and the network device.

According to some embodiments, the minimum distance that the network device allows all terminal devices to access depends on an orbit altitude of the network device, or, the minimum distance that the network device allows all terminal devices to access depends on a distance between a nearest terminal device among all the terminal devices and the network device.

According to some embodiments, the minimum distance that the network device allows the terminal device to access is a minimum distance between the network device and the terminal device during a relative movement between the network device and the terminal device.

According to some embodiments, if T=T2−ΔT2, the slot for sending the second signal is a slot $(n*2^{m2-m1}+\lceil (T2-\Delta T2)/Ts \rceil-K2)$, where T2 is determined according to a maximum distance that the network device allows all terminal devices to access, ΔT2 is determined based on a difference between the maximum distance that the network device allows all the terminal devices to access and a maximum distance that the network device allows the terminal device to access, and K2 is determined according to the maximum distance that the network device allows the terminal device to access and a real-time distance between the terminal device and the network device.

According to some embodiments, the maximum distance that the network device allows all terminal devices to access depends on a distance between the network device and a farthest terminal device among all the terminal devices.

According to some embodiments, the maximum distance that the network device allows the terminal device to access is a maximum distance between the network device and the terminal device during a relative movement between the network device and the terminal device.

According to some embodiments, the T1 and/or the T2 are received by the terminal device via a system broadcast message, and/or, the ΔT1 and/or the ΔT2 are received by the terminal device via a system broadcast message or user-specific signaling.

According to some embodiments, the processing unit 620 is further configured to:

in response to the ΔT1 not being sent to the terminal device, determine that the ΔT1 is 0; and/or, in response to the ΔT2 not being sent to the terminal device, determine that the ΔT2 is 0.

According to some embodiments, the T1 or the T2 is used for initial access of the terminal device.

According to some embodiments, the first signal is a Physical Downlink Shared Channel (PDSCH), the second signal is an acknowledgement (ACK)/non-acknowledgement (NACK) feedback signal, and the dynamic adjustment value K for the bidirectional delay is indicated by a Physical Downlink Control Channel (PDCCH) which schedules the PDSCH.

According to some embodiments, the first signal is a PDCCH, the second signal is a Physical Uplink Shared Channel (PUSCH), and the dynamic adjustment value K for the bidirectional delay is indicated by the PDCCH.

According to some embodiments, the first signal is a PDCCH, the second signal is a Channel State Information (CSI) feedback signal, and the dynamic adjustment value K for the bidirectional delay is indicated by the PDCCH.

According to some embodiments, the first signal is a PDCCH, the second signal is a Sounding Reference Signal (SRS), and the dynamic adjustment value K for the bidirectional delay is indicated by the PDCCH.

Optionally, in some embodiments, the above-mentioned communication module may be a communication interface or a transceiver, or an input/output interface of a communication chip or a system-on-chip. The above determination module may be one or more processors.

Figure 7:
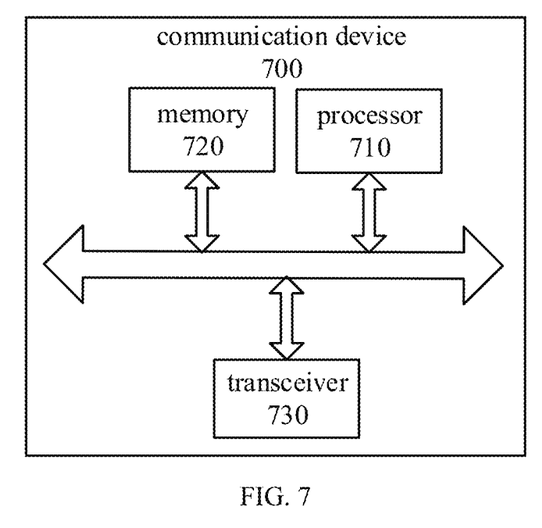
FIG. 7 is a schematic structural diagram of a communication device according to an embodiment of the present disclosure.

FIG. 7 is a schematic structural diagram of a communication device 700 according to an embodiment of the present disclosure. The communication device 700 shown in FIG. 7 includes a processor 710, and the processor 710 may call and run a computer program from a memory to perform the method in embodiments of the present disclosure.

According to embodiments, as shown in FIG. 7, the communication device 700 may further include a memory 720. The processor 710 may call and run a computer program from the memory 720 to perform the method in embodiments of the present disclosure.

The memory 720 may be a separate device independent of the processor 710, or may be integrated in the processor 710.

According to embodiments, as shown in FIG. 7, the communication device 700 may further include a transceiver 730, and the processor 710 may control the transceiver 730 to communicate with other devices. Specifically, the transceiver may send information or data to other devices, or receive information or data sent by other devices.

The transceiver 730 may include a transmitter and a receiver. The transceiver 730 may further include one or more antennas.

According to embodiments, the communication device 700 may specifically be the network device according to an embodiment of the present disclosure, and the communication device 700 may implement the corresponding processes implemented by the network device in the method embodiments of the present disclosure.

According to embodiments, the communication device 700 may specifically be the mobile terminal/terminal device in embodiments of the present disclosure, and the communication device 700 may implement the corresponding processes implemented by the mobile terminal/terminal device in the method embodiments of the present disclosure. For brevity, details are not repeated here.

Figure 8:
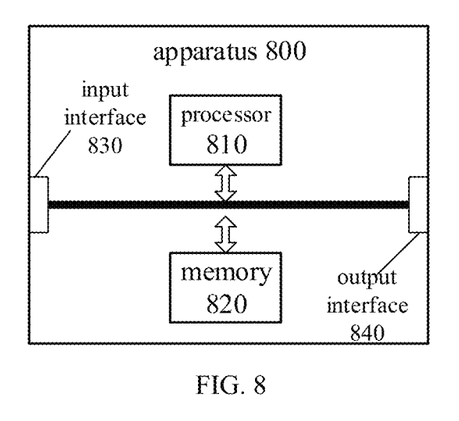
FIG. 8 is a schematic structural diagram of an apparatus according to an embodiment of the present disclosure.

FIG. 8 is a schematic structural diagram of an apparatus 800 according to an embodiment of the present disclosure. The apparatus 800 shown in FIG. 8 includes a processor 810, and the processor 810 can call and run a computer program from a memory to implement the method according to embodiments of the present disclosure.

According to embodiments, as shown in FIG. 8, the apparatus 800 may further include a memory 820. The processor 810 may call and run a computer program from the memory 820 to implement the method according to embodiments of the present disclosure.

The memory 820 may be a separate device independent of the processor 810, or may be integrated in the processor 810.

According to embodiments, the apparatus 800 may further include an input interface 830. The processor 810 may control the input interface 830 to communicate with other devices or apparatuses, and specifically, the processor 810 can control the input interface to obtain information or data sent by other devices or apparatuses.

According to embodiments, the apparatus 800 may further include an output interface 840. The processor 810 can control the output interface 840 to communicate with other devices or apparatuses, and specifically, the processor 810 can control the output interface 840 to output information or data to other devices or apparatuses.

According to embodiments, the apparatus can be applied to the network device in embodiments of the present disclosure, and the apparatus can implement the corresponding processes implemented by the network device in various methods according to embodiments of the present disclosure. For brevity, details are not repeated herein again.

According to embodiments, the apparatus can be applied to the mobile terminal/terminal device in embodiments of the present disclosure, and the apparatus can implement the corresponding processes implemented by the mobile terminal/terminal device in various methods according to embodiments of the present disclosure. For brevity, details are not repeated herein again.

It should be understood that the apparatus in the embodiments of the present disclosure may be a chip, and the chip may also be referred to as a system-level chip, a system chip, a chip system, or a system-on-chip, etc.

Figure 9:
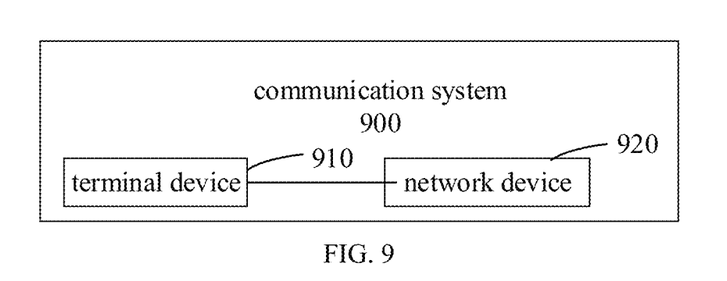
FIG. 9 is a schematic block diagram of a communication system according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 may be used to implement the corresponding functions implemented by the terminal device in the above method embodiments, and the network device 920 may be used to implement the corresponding functions implemented by the network device in the above method embodiments. For brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, wherein the method is applied to a non-terrestrial network (NTN) system, and the method comprises:
receiving, by a terminal device, a first signal, wherein the first signal is sent by a network device in a slot n;
receiving, by the terminal device, a basic value T for a bidirectional delay and a dynamic adjustment value K for the bidirectional delay which are sent by the network device, wherein the dynamic adjustment value K for the bidirectional delay is determined based on the basic value T for the bidirectional delay and a real-time distance between the terminal device and the network device; and
determining, by the terminal device, a slot for sending a second signal to the network device according to the slot n, the basic value T for the bidirectional delay and the dynamic adjustment value K for the bidirectional delay, wherein the second signal is a response signal for the first signal.

2. The method according to claim 1, wherein a time unit for the basic value T for the bidirectional delay is absolute time, a time unit for K is a slot, and the slot for sending the second signal is a slot $(n*2^{m2-m1}+\lceil T/Ts \rceil+K)$,
where m1 is a subcarrier spacing coefficient of the first signal, m2 is a subcarrier spacing coefficient of the second signal, Ts is a duration of a slot corresponding to a bandwidth part where the second signal is located, $\lceil \ \rceil$ means rounding up, and K is an integer.

3. The method according to claim 2, wherein the time unit for the basic value T for the bidirectional delay is Tc, and Tc is a minimum time unit used by a physical layer interface.

4. The method according to claim 3, wherein Tc=0.509 ns.

5. The method according to claim 2, wherein:
if T=T1+ΔT1, the slot for sending the second signal is a slot $(n*2^{m2-m1}+\lceil (T1+\Delta T1)/Ts \rceil+K1)$, where T1 is determined according to a minimum distance that the network device allows all terminal devices to access, ΔT1 is determined based on a difference between the minimum distance that the network device allows all terminal devices to access and a minimum distance that the network device allows the terminal device to access, and K1 is determined according to the minimum distance that the network device allows the terminal device to access and a real-time distance between the terminal device and the network device.

6. The method according to claim 5, wherein the minimum distance that the network device allows all terminal devices to access depends on an orbit altitude of the network device, or,
the minimum distance that the network device allows all terminal devices to access depends on a distance between a nearest terminal device among all the terminal devices and the network device.

7. The method according to claim 5, wherein the minimum distance that the network device allows the terminal device to access is a minimum distance between the network device and the terminal device during a relative movement between the network device and the terminal device.

8. The method according to claim 2, wherein:
if T=T2−ΔT2, the slot for sending the second signal is a slot $(n*2^{m2-m1}+\lceil(T2-\Delta T2)/Ts\rceil-K2)$,
where T2 is determined according to a maximum distance that the network device allows all terminal devices to access, ΔT2 is determined based on a difference between the maximum distance that the network device allows all the terminal devices to access and a maximum distance that the network device allows the terminal device to access, and K2 is determined according to the maximum distance that the network device allows the terminal device to access and a real-time distance between the terminal device and the network device.

9. The method according to claim 8, wherein the maximum distance that the network device allows all terminal devices to access depends on a distance between the network device and a farthest terminal device among all the terminal devices.

10. The method according to claim 8, wherein the maximum distance that the network device allows the terminal device to access is a maximum distance between the network device and the terminal device during a relative movement between the network device and the terminal device.

11. A wireless communication method, wherein the method is applied to a non-terrestrial network (NTN) system, and the method comprises:
sending, by a network device, a first signal to a terminal device in a slot n;
sending, by the network device, a basic value T for a bidirectional delay and a dynamic adjustment value K for the bidirectional delay to the terminal device, wherein the dynamic adjustment value K for the bidirectional delay is determined based on the basic value T for the bidirectional delay and a real-time distance between the terminal device and the network device; and
determining, by the network device, a slot for the terminal device to send a second signal to the network device according to the slot n, the basic value T for the bidirectional delay and the dynamic adjustment value K for the bidirectional delay, wherein the second signal is a response signal for the first signal.

12. The method according to claim 11, wherein the first signal is a Physical Downlink Shared Channel (PDSCH), the second signal is an acknowledgement (ACK)/non-acknowledgement (NACK) feedback signal, and the dynamic adjustment value K for the bidirectional delay is indicated by a Physical Downlink Control Channel (PDCCH) which schedules the PDSCH.

13. The method according to claim 11, wherein the first signal is a PDCCH, the second signal is a Physical Uplink Shared Channel (PUSCH), and the dynamic adjustment value K for the bidirectional delay is indicated by the PDCCH.

14. The method according to claim 11, wherein the first signal is a PDCCH, the second signal is a Channel State Information (CSI) feedback signal, and the dynamic adjustment value K for the bidirectional delay is indicated by the PDCCH.

15. The method according to claim 11, wherein the first signal is a PDCCH, the second signal is a Sounding Reference Signal (SRS), and the dynamic adjustment value K for the bidirectional delay is indicated by the PDCCH.

16. A terminal device, wherein the terminal device is a terminal device in a non-terrestrial network (NTN) system, and the terminal device comprises one or more processors, memory storing a plurality of programs that, when executed by the one or more processors, cause the terminal device to:
receive a first signal, wherein the first signal is sent by a network device in a slot n;
receive a basic value T for a bidirectional delay and a dynamic adjustment value K for the bidirectional delay which are sent by the network device, wherein the dynamic adjustment value K for the bidirectional delay is determined based on the basic value T for the bidirectional delay and a real-time distance between the terminal device and the network device; and
determine a slot for sending a second signal to the network device according to the slot n, the basic value T for the bidirectional delay and the dynamic adjustment value K for the bidirectional delay, wherein the second signal is a response signal for the first signal.

17. The terminal device according to claim 16, wherein a time unit for the basic value T for the bidirectional delay is absolute time, a time unit for K is a slot, and the slot for sending the second signal is a slot $(n*2^{m2-m1}+\lceil T/Ts\rceil+K)$,
where m1 is a subcarrier spacing coefficient of the first signal, m2 is a subcarrier spacing coefficient of the second signal, Ts is a duration of a slot corresponding to a bandwidth part where the second signal is located, ⌈ ⌉ means rounding up, and K is an integer.

18. The terminal device according to claim 17, wherein the time unit for the basic value T for the bidirectional delay is Tc, and Tc is a minimum time unit used by a physical layer interface.

19. The terminal device according to claim 18, wherein Tc=0.509 ns.

20. The terminal device according to claim 17, wherein:
if T=T1+ΔT1, the slot for sending the second signal is a slot $(n*2^{m2-m1}+\lceil T1+\Delta T1)/Ts\rceil+K1)$,
where T1 is determined according to a minimum distance that the network device allows all terminal devices to access, ΔT1 is determined based on a difference between the minimum distance that the network device allows all terminal devices to access and a minimum distance that the network device allows the terminal device to access, and K1 is determined according to the minimum distance that the network device allows the terminal device to access and a real-time distance between the terminal device and the network device.

* * * * *